April 21, 1970        J. C. CLARK        3,507,446

SPHERICAL TRIANGLE RESOLVER

Filed July 22, 1968        2 Sheets-Sheet 1

INVENTOR.
Joseph C. Clark
BY
William M. Hobby
Attorney

April 21, 1970     J. C. CLARK     3,507,446
SPHERICAL TRIANGLE RESOLVER
Filed July 22, 1968     2 Sheets-Sheet 2

INVENTOR.
Joseph C. Clark
BY
William M. Hobby
Attorney

United States Patent Office 3,507,446
Patented Apr. 21, 1970

3,507,446
SPHERICAL TRIANGLE RESOLVER
Joseph C. Clark, 4843 Backacher Lane,
Orlando, Fla. 32806
Filed July 22, 1968, Ser. No. 746,608
Int. Cl. G01c 21/24
U.S. Cl. 235—61
14 Claims

ABSTRACT OF THE DISCLOSURE

A spherical triangular resolving apparatus for determining a Great Circle Course from an instant position to and objective position from inputs of the instant latitude, the objective latitude and the difference in longitude of the two positions. A pair of shafts are mounted for rotation about axes and are connected about a center point by a linkage that causes rotation of said shafts when the axis of one shaft is displaced relative to the other shaft with respect to the center point. The rotation of one shaft about its axis indicates the Great Circle Course when the other shaft is moved about the center point in accordance with inputs analogous to the instant latitude, objective latitude and difference in longitude.

BACKGROUND OF THE INVENTION

Field of the invention

The present invention relates to mechanical computers and more specifically to a spherical triangle resolver especially adapted for use in the field of navigation for determining a course from an instant position to an objective position. In particular a mechanical device is provided having inputs of the instant latitude, the objective latitude and the difference between the instant and objective longitudes, and an output indicating the Great Circle Course.

Description of the prior art

The Great Circle Course is the course indicating the shortest distance between two points on a sphere, with the earth being taken as a perfect sphere. Other types of courses are used, but from any but the shortest distances, the Great Circle Course is preferred since the distance traveled will be shorter.

In the past several methods have been used to determine the Great Circle Course. These include the mathematics of solving the spherical triangle using as known points the present location, the objective and a pole of the earth. That is to say from a navigator's known latitude of position and objective, two sides of a triangle can be determined and from the difference in longitude between the instant position and objective position the angle between the two sides can be determined. The angle of the course can be determined, as can be the distance between the positions, by the use of spherical trigonometry.

However, mathematical solving for the course is time consuming, and subject to errors in calculations. Accordingly, other methods have been developed to solve for the course. One such method has been to program an electronic computer to perform the necessary calculations. The computer is, of course, expensive and time consuming in making the necessary inputs while still subject to human errors during the programming operation.

Finally, Patent No. 2,077,398 entitled, "Navigating Instrument," and patented Apr. 20, 1937 by the present inventor discloses an instrument which automatically and discontinuously resolves the spherical triangle among other features and to which reference is made for a more detailed explanation of the theory involved in the present invention.

SUMMARY OF THE INVENTION

A spherical triangle resolver is provided having a pair of shafts adapted for rotation about their axes. The shafts are connected together by a connection having a pair of arms, each one transversely and movably mounted to one of the shafts and also connected to each other. Each arm has a spring biasing the arm away from the other arm at the connection between the arms, so that when one shaft is moved relative to the second shaft the shafts may rotate on their axes. One shaft is adapted to be moved relative to the other responsive to inputs analogous to the latitude of the instant position, the latitude of the objective position and the difference in longitude, and the other shaft is adapted to be rotated to indicate the Great Circle Course between said instant position and the objective position.

BRIEF DESCRIPTION OF THE DRAWINGS

Other objects, features, and advantages of his invention will be apparent from a study of the written description and the drawings in which.

DESCRIPTION OF THE PREFERRED EMBODIMENT

Figure 1:
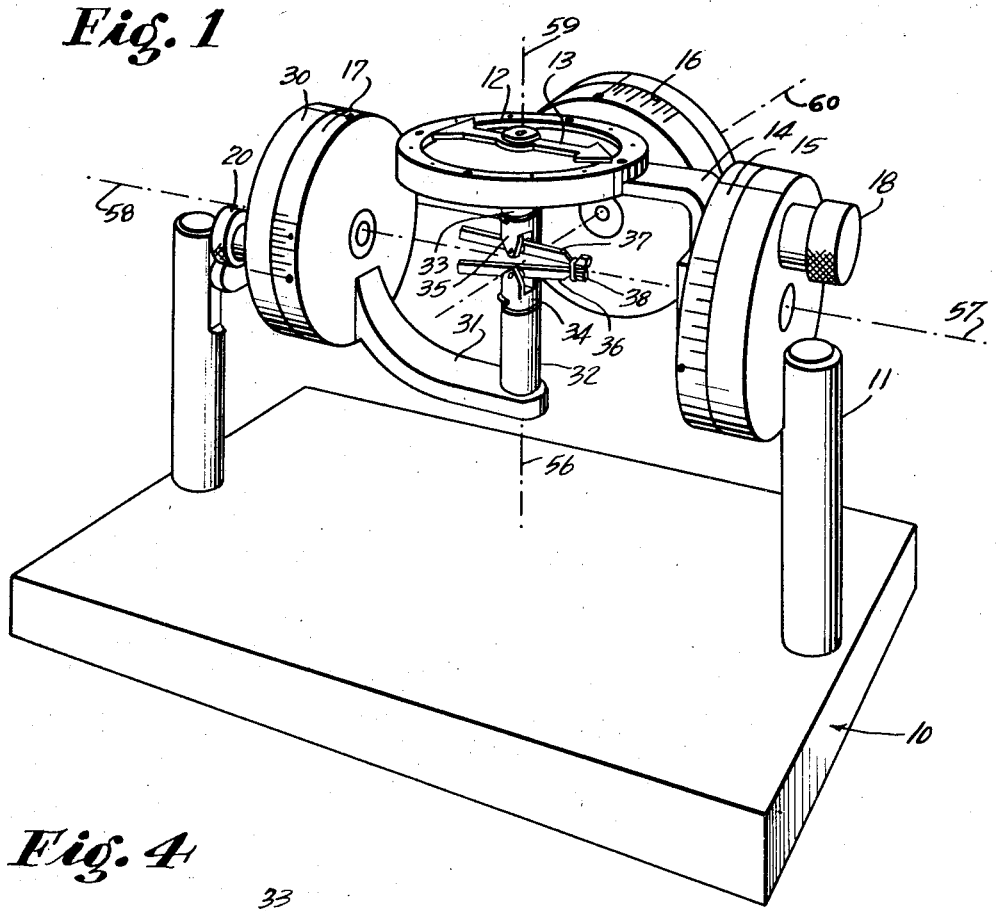
FIGURE 1 is a perspective view of one embodiment of the present invention.
Figure 2:
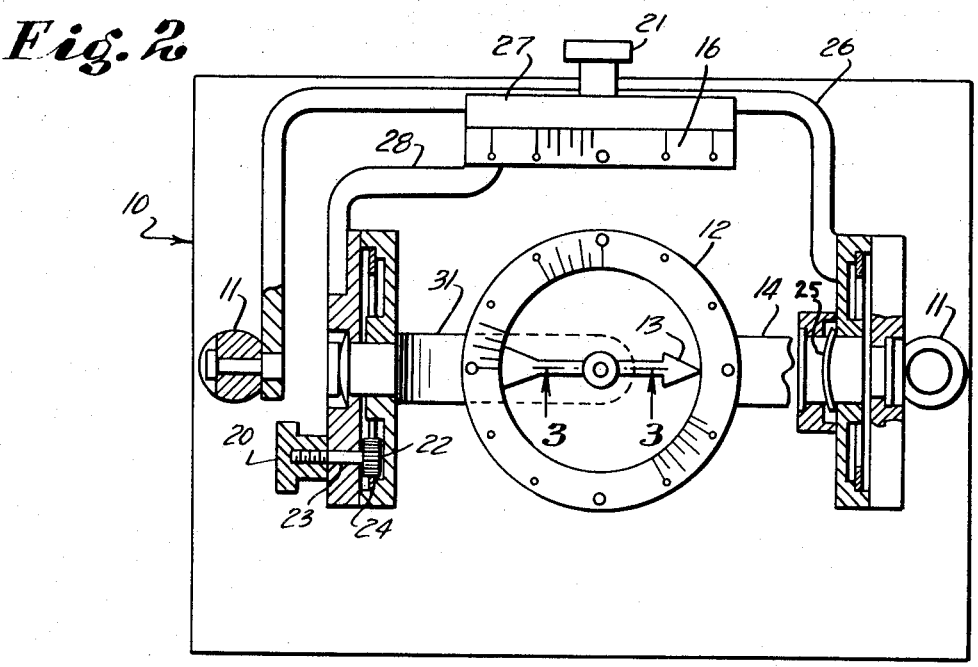
FIGURE 2 is a top plan view with a breakaway of the dials of the embodiment of FIGURE 1.

FIGURES 1 and 2 show views of the preferred embodiment on a support structure 10 having a pair of posts 11. A compass 12 has a dial graduated in degrees from zero to 360 with dots indicating 30 degree intervals. The north dot may be red or have some other means of indicating which mark is North. The compass 12 has a needle 13 that points to the Great Circle Course from the latitude and longitude of instant position to the latitude and longitude of the objective position as resolved by the settings of the dials to be discussed in more detail later. The compass 12 is supported by a bracket 14.

Compass 12 produces the output course dependent upon the inputs on three dials, the latitude of instant position dial 15, the difference in longitude dial 16 and the latitude of objective dial 17. The latitude of instant position dial 15 is graduated in degrees from zero (equator) plus and minus 90 degrees or to the North and South poles. Turning knob 18 clockwise from zero moves the instant position into latitudes north of the equator while counterclockwise moves the instant position to latitudes south of the equator.

Each of dials 15, 16 and 17 is operated by rotating knobs 18, 21 and 20 respectively which in turn are fixedly connected to pinions 22 by shafts 23 in the dial assemblies. Pinions 22 each engage an internal gear 24 attached to each of the dials and upon rotation of the pinions 22, the gears 24 are rotated to rotate the respective dials. Each dial assembly also has a spring washer 25 to maintain a constant pressure between the dials and the dial supports. Rotation of the latitude of instant position dial 15 rotates the latitude of instant position dial assembly having rotatable bracket 26 which is also rotatably connected to one of the pair of posts 11 for support. Rotation of dial 15 rotates bracket 26 holding dial 16 support structure 27. Dial 16 is thus also moved along with a bracket 28 which forms a part of the difference in longitude assembly and is fixedly attached to dial 16 and to dial 17 support structure 30. Thus rotation of dial 15 moves bracket 26, dial 16, bracket 28, dial 17 and a bracket 31. Similarly, turning knob 21 rotates the difference in longitude dial 16 on its axis and moves bracket 28, dial 17 and bracket 31, while turning knob 20 rotates dial 17 and moves bracket 31.

Bracket 31 has a lower support tube 32 fixedly attached thereto and the compass 12 has an upper support tube 33 attached thereto. A lower clevis 34 is rotatably attached to tube 32 and an upper clevis 35 is rotatably attached to tube 33. Clevis 34 has an arm 36 rotatably attached thereto and clevis 35 has an arm 37 rotatably attached thereto and arms 36 and 37 are movably attached together at one end by a link 38. While the present invention has been illustrated as having a rotatable shaft with fixed tubes, it should be clear that fixed shafts could be used with rotatable tubes without departing from the spirit and scope of the invention.

Figure 4:
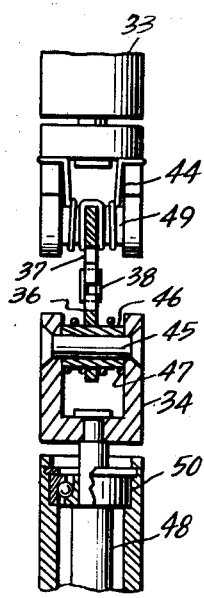
FIGURE 4 is a view taken along line 4—4 of FIGURE 3.
Figure 3:
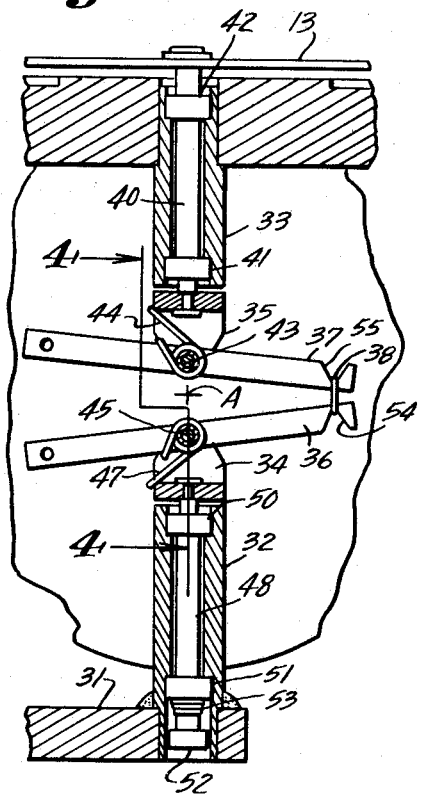
FIGURE 3 is a view taken along line 3—3 of FIGURE 2.

Referring now to FIGURES 3 and 4, compass 12 and needle 13 can be viewed as can tubes 32 and 33 and arm 37 movably connected to clevis 35. A shaft 40 is rotatably held in tube 33 by ball bearings 41 and 42 and shaft 40 is fixedly attached to compass needle 13 on one end and has clevis 35 on the other, whereby rotation of clevis 35 rotates shaft 40 and needle 13. Arm 37 is pinned to clevis 35 by a pin 43 inside a bushing 49 and is spring biased or torqued by spring 44 against link 38 and against one end of arm 36. Arm 36 is rotatably pinned to clevis 34 by pin 45 inside bushing 46 and is spring biased or torqued by spring 47 in the opposite direction of arm 37 whereby the arms 36 and 37 are maintained attached by link 38 seated in notches 54 and 55 in each arm. Clevis 34 is fixedly attached to shaft 48 which rides inside tube 32 on ball bearings 50 and 51 and is held in place by cap 52 crimped into place and riding against ball bearing 51. A spring 53 may be used to maintain a tight fit. Tube 32 is fixedly attached to bracket 31. This joint assembly for connecting shafts 40 and 48 is such that various movements of bracket 31 and tube 32 will result in rotation of shafts 48 and 40 and compass needle 13. That is to say, that any movement of the axis of shaft 48 out of a straight line with axis 40 will tend to rotate shafts 40 and 48 about their respective axes unless the positions are on the same meridian. When the axis of shaft 48 is out of alignment with the axis of shaft 40, the spring loaded arms 36 and 37 urge the shafts into rotation until the arms 36 and 37 and the axes of shafts 40 and 48 are in a common plane which plane will always include a point A centered between the arms 36 and 37 and is indicative of the center of the sphere or the earth. As can be seen at this point, bracket 31 and tube 32 are moved by rotation of the latitude of instant position dial 15, the difference in longitude dial 16 or by the latitude of objective position dial 17 to resolve the spherical triangle represented by their positions or as will be obvious to those skilled in the art, what is actually happening is the solving of the spherical triangle by having one member 180 degrees out of phase as though with the other on the opposite side of the sphere.

This invention is not to be construed as limited to the particular forms disclosed herein, since these are to be regarded as illustrative rather than restrictive.

I claim:

1. A spherical triangle resolver for solving the Great Circle Course for inputs of the latitude of instant position, latitude of the objective position and the difference in longitude comprising in combination: a pair of shaft means, each said shaft means being rotatable about an axis, said axes of said shaft means having an imaginary intersecting center point; a connecting means for connecting said shaft means to each other, including a pair of arms, each said arm movably mounted transverse to one of said shaft means, said arms also being movably connected to each other and biasing means biasing one said arm away from the other said arm at the connection between said arms; whereby movement of one said shaft means relative to the other said shaft means around said center point is adapted to rotate both said shaft means about their respective axes; said one shaft means being adapted for movement around said center point responsive to inputs analogous to the latitude of instant position, the latitude of objective position and the difference in longitude and said other shaft means having means to indicate the Great Circle Course between said instant position and said objective position of said inputs.

2. A spherical triangle resolver according to claim 1 in which said biasing means are springs.

3. A spherical triangle resolver according to claim 2 in which said means to indicate the Great Circle Course is a compass having a compass needle fixedly attached to said other shaft means.

4. A spherical triangle resolver according to claim 3 in which said arms are movably connected to each other by a link seated in notches in each said arm.

5. A spherical triangle resolver according to claim 4 in which each said shaft means passes through a tube and is adapted to rotate in said tube.

6. A spherical triangle resolver according to claim 5 in which each said input is a rotatable dial.

7. A spherical triangle resolver according to claim 6 in which the rotatable dial of said latitude of objective input is adapted to move said one shaft means about said center point upon rotation thereof.

8. A spherical triangle resolver according to claim 7 in which the rotatable dial of said difference in longitude input is adapted to move said latitude of objective dial and said one shaft means about said center point upon rotation thereof.

9. A spherical triangle resolver according to claim 8 in which the rotatable dial of said latitude of instant position input is adapted to move said difference in longitude dial, said latitude of objective position dial and said one shaft means about said center point upon rotation thereof.

10. In a spherical triangle resolver, the combination comprising:
   (a) fixed rotatable shaft means having an axis;
   (b) movable rotatable shaft means having an axis;
   (c) a pair of arms having axes, each said arm being movably connected by a connecting means to one said shaft means;
   (d) torque means for biasing each said arm around said connecting means;
   (e) connecting link means connecting said arms together; and
   (f) whereby the axes of said fixed and movable shafts and the axes of said arms form a common imaginary plane; said plane varying in accordance with the location of said movable rotatable shaft and both shafts being rotatable in accordance with the movement of said arms aligning with said plane upon movement of said movable rotatable shaft.

11. The apparatus according to claim 10 but including a needle connected to said fixed rotatable shaft to indicate the one direction of said imaginary plane.

12. The apparatus according to claim 11 in which said connecting means includes a pin passing through each said arm.

13. The apparatus according to claim 12 in which said torque means includes a spring for each said arm.

14. The apparatus according to claim 13 in which each said shaft has a clevis on one end thereof for attaching each said pin thereto.

References Cited

UNITED STATES PATENTS

| 2,555,328 | 6/1951 | Esval et al. | 33—204 |
| 2,576,149 | 11/1951 | Sharp | 33—1 |
| 3,002,679 | 10/1961 | Abel | 235—61 |

STEPHEN J. TOMSKY, Primary Examiner

U.S. Cl. X.R.

33—1